No. 872,791. PATENTED DEC. 3, 1907.
A. BLAUVELT.
FIRE EXTINGUISHER VALVE.
APPLICATION FILED JULY 20, 1903.
2 SHEETS—SHEET 2.
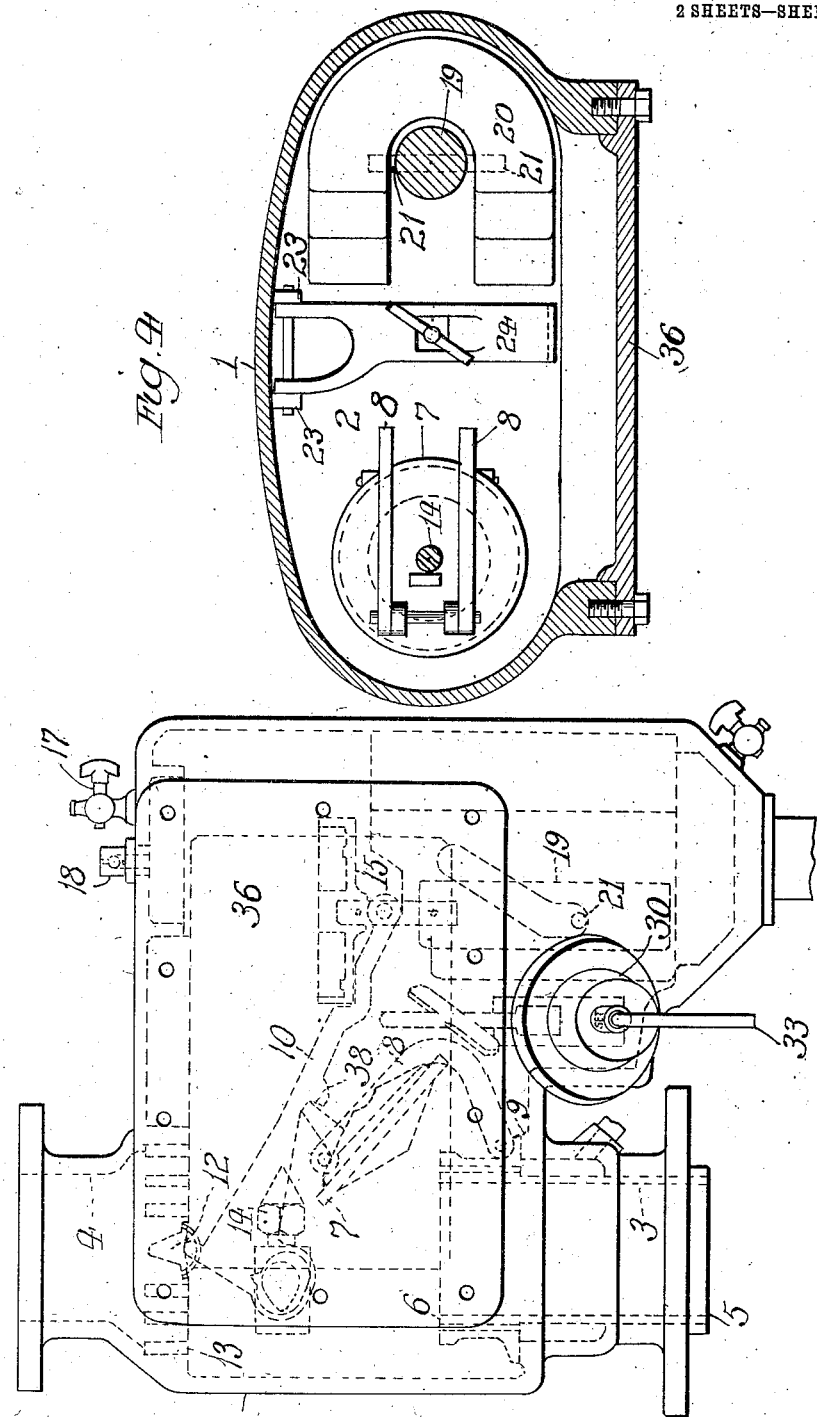

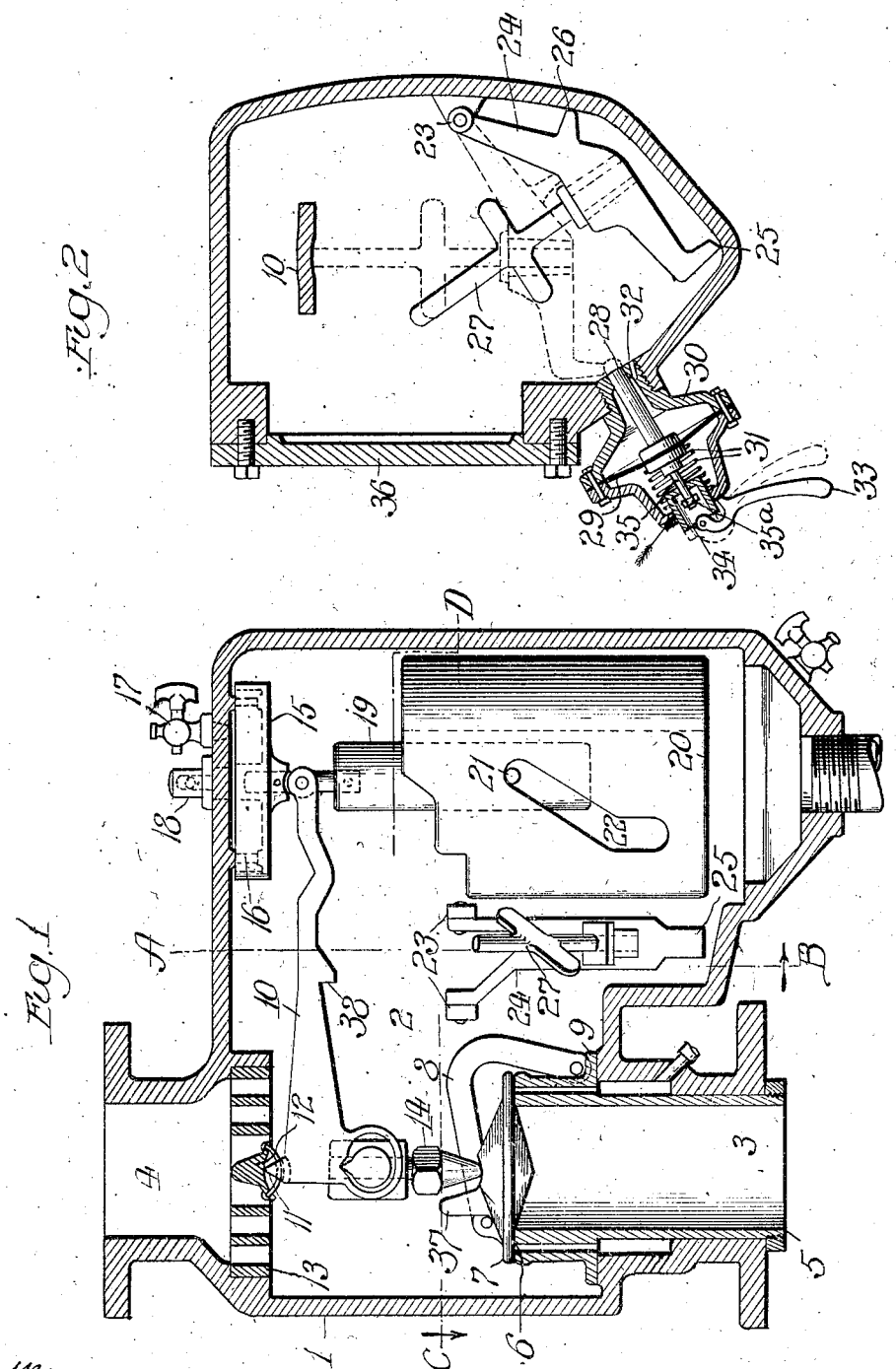

UNITED STATES PATENT OFFICE.

ALBERT BLAUVELT, OF CHICAGO, ILLINOIS.

FIRE-EXTINGUISHER VALVE.

No. 872,791.     Specification of Letters Patent.     Patented Dec. 3, 1907.

Application filed July 20, 1903. Serial No. 166,327.

*To all whom it may concern:*

Be it known that I, ALBERT BLAUVELT, residing at Chicago, Cook county, Illinois, have invented certain new and useful Improvements in Fire-Extinguisher Valves, of which the following is a specification.

My invention relates to automatic valves for fire extinguisher systems working on the dry pipe plan, in which the water inlet valve is maintained in closed condition by the air pressure of the system but is permitted to open to admit water to the distributing pipes of the system whenever the air pressure is relieved or reduced particularly as by the firing of one or more of the usual sprinkler heads.

The object of my invention is to produce a reliable and efficient valve of the character described and also to provide simple means for resetting the valve after being operated.
The features of advantage and utility of my valve mechanism will be apparent from the description hereinafter given.

In the drawings, Figure 1 is a central longitudinal section of my valve device; Fig 2 a section on the line A—B of Fig. 1; Fig. 3 an elevation of my valve device, but showing, by dotted lines, the position of the contained movable parts in open position, and Fig. 4 a sectional plan on line C—D of Fig. 1.
The valve casing 1 has a valve chamber 2 arranged to communicate with the water supply pipe or main through the passage 3 and with the distributing pipes of the sprinkler system through the passage 4. The water passage 3 is fitted with a short pipe or sleeve 5 extending into the valve chamber and there provided at its upper end with a valve seat 6 upon which seats the valve proper marked 7.
The valve is pivotally connected to one end of a pair of U-shaped links or arms 8 whose other end is pivoted to the flange 9 of the pipe 5, with the result that, when permitted, the valve 7 will be forced upwardly and carried laterally by the water always present below the valve.

To normally hold the valve upon its seat, I employ a lever 10 arranged to be kept in horizontal position by the air pressure of the system as hereinafter described.

The lever 10 is provided at one end above the valve with an upwardly directed pivot edge 11 adapted to bear in a groove or socket 12 formed in the center of a spider or grating 13 in the passageway 4, and with a loop support for the lever when disengaged, as in Fig. 2, all as clearly indicated in Fig. 1. Upon the same end of this lever is pivoted a screw 14 having a conical depending head adapted to bear upon the top face of the valve 7 in the manner shown in Fig. 1. When the valve is set closed the pivot point 11 and the conical head of the screw 14 are in or near alinement.

To the outer end of the lever 10 is pivotally connected a flanged holding disk 15 which, in the normal position of the parts, is arranged to seat upon the annular flange 16 depending from the top of the valve casing. The holding disk may be supplied with a quantity of oil or grease in order to provide a suitable seal.

To exhaust the air pressure from the space within the holding disk, I provide a pet cock 17, governing a passage leading from the casing at a point within the annular flange 16. To keep the interior of the holding disk exhausted to atmosphere, though the pet cock be closed, and the disk 15 may leak somewhat, an outlet pipe 18 provided with a ball check is arranged on the casing as shown by Figs. 1 and 3. This ball check closes automatically should the valve trip and admit water. When the system is charged with air pressure, that is in normal condition, the pressure in the valve chamber 2 exerted upon the underside of the disk 15 holds such disk in elevated position and consequently holds the lever mechanism as shown in Fig. 1, with the pivot point 11 and end of screw 14 in alinement, whereby the valve 7 is kept upon its seat.

The disk 15 is held in elevated position against the force of gravity of a weight 19 tending to pull it downward which is arranged within a horseshoe shaped weight 20. The weight 19 which is the lighter of the two is provided with lateral studs or pins 21 adapted to engage the upper end of slots 22 formed in the larger weight and preferably having the peculiar shape shown, that is, an inclined portion and a vertical portion. When the valve device is set ready for action, the disk 15 and operating lever 10 are acted upon by the combined gravity of the two weights, but in the operation of the valve device, the heavier weight 20 will act only during the initial movement of the lever, until such weight seat upon the bottom of the casing. Continued movement of the movable parts will be caused by the lighter weight. Whenever the air pressure of the system is released or reduced, the disk 15 is no longer held in elevated position, but pulled off its seat by the weights, with the result that by reason of the consequent downward movement of the outer end of the lever 10, the alinement is broken between that part of the lever which constitutes a strut between the spider 13 and the valve 7. The valve is thereupon forced open and the water rushes upwardly from the inlet 3 and through the outlet 4 to the distributing pipes of the system. The lighter weight is adapted to be lifted by hand, the subsequent lifting of the combined weights in order to set the valve device after being operated is accomplished by the following described mechanism: Upon lugs 23 is pivoted a frame or bridge 24 having a hook-shaped free end 25 and also a stop lug 26 intermediate of its length. The stop lug 26 strikes the side of the casing as shown in Fig. 2. An adjustable supporting rod 27 screws into a detachable nut set in the bridge 24, as shown, and is adapted in one position to contact and support the operating lever in a positive manner. The bridge is held in operative position, shown by dotted lines in Fig. 2, by an inwardly spring pressed bolt or pin 28 controlled in the opposite direction by the air pressure of the system. When the bridge is in operative position as described its hook shaped end 25 rests upon the pin 28 and is thereby held in that position so long as the pin is kept projected.

The pin 28 is operated by a movable abutment, in the present instance a diaphragm 29 secured to such pin and arranged in a casing 30 secured to the main valve casing. A coiled spring 31 normally tends to hold the pin projected inwards in the path of travel of the free end of the bridge and thereby hold the operating lever in set position, so long as the system is devoid of air pressure in excess of the pressure needed to support the disk 15. However, when the system is now put under pressure, the air will pass through the hole 32 to the inner face of the diaphragm, with the result that when the air pressure exceeds the tension of the spring, the bolt or pin 28 will be retracted and the bridge and supporting rod permitted to drop to the position shown in full lines in Fig. 2. For the purpose of operating the bolt by hand whenever desired, I provide a hand lever 33 pivoted to a sleeve or thimble 34, through which the stem 35 of the diaphragm is free to slide but which is nevertheless operatively connected thereto by reason of the nut 35ª at the outer end of such stem. Access is had to the valve chamber 2 by removing the slide 36 of the casing.

The operation of the mechanism will be quite apparent from the foregoing description. The normal position is clearly shown in Fig. 1, in which the valve is closed or seated and the resetting mechanism is in inoperative position. The position of parts after being operated is shown in Fig. 3, by dotted lines, in which the valve is open and admitting water to the system. The opening movement of the valve is limited by the contact of the lug 37 against the shoulder 38 on the operating lever.

The air under pressure admitted to the system exerts pressure against the diaphragm 29 and thereby moves the diaphragm and retracts the pin 28, as hereinbefore described, in which movement of the diaphragm its stem 35 moves freely to the left (Fig. 2), through the sleeve or thimble 34, whereupon the setting mechanism is free to drop to normal position in the manner hereinbefore explained. It is the duty of the operator after the air is turned on to always operate the handle 33 to dotted position with the result that the sleeve or thimble will be drawn outwardly to expose the word "Set" arranged to show upon the outer surface of such sleeve. In case, for any reason, the retractable pin 28 should stick or fail to be withdrawn, this movement of the sleeve will positively withdraw it and thereby always assure set position, even though the automatic feature should fail in its function. When the sleeve is in its inward position, the word "Set" is covered, being positioned at the point of the arrow in Fig. 2, and the same is uncovered or exposed when the sleeve is withdrawn as described.

I claim:

1. An automatic valve for sprinkler systems comprising a valve casing having an inlet communicating with the water supply and with an outlet communicating with the system, said inlet and outlet being in substantial alinement, a valve governing said inlet, an operating lever which, when in normal position, is arranged to hold the valve seated, means arranged beyond the line of passage of the water and laterally of the inlet and outlet and controlled by the air pressure of the system to hold such lever in normal position, and a weight acting on such lever in opposition to such air pressure and operating, when permitted by the release of the air pressure, to positively move the operating lever and thereby open the valve.

2. An automatic valve for sprinkler systems comprising a valve casing having a pressure chamber communicating with the system and with the water supply, a valve governing the water supply, an operating lever when in normal position arranged to hold the valve seated, a flanged disk connected to one end of said lever, a weight also connected thereto, said disk being arranged to seat upon an interior wall of the casing, and means for exhausting the pressure from the interior of such disk.

3. An automatic valve for sprinkler systems comprising a valve casing communicating with the system and with the water supply, a valve governing the water supply, an operating lever when in normal position arranged to hold the valve seated, a flanged disk connected to one end of said lever and arranged to seat upon an interior wall of the casing, a weight also connected thereto, a pet cock for exhausting the pressure from the interior of such disk, and a ball check for maintaining such interior of the disk at atmospheric pressure.

4. An automatic valve for sprinkler systems comprising a valve casing communicating with the system and with the water supply, a valve governing the water supply, an operating lever when in normal position arranged to hold the valve seated, and a resetting device governed by the air pressure of the system for holding the operating lever in set or normal position but arranged to be automatically withdrawn from such service when the system is charged with air pressure.

5. An automatic valve for sprinkler systems comprising a valve casing communicating with the system and with the water supply, a valve governing the water supply, an operating lever when in normal position arranged to hold the valve seated, and a resetting device consisting of a pivoted bridge, an adjustable rod carried thereby and adapted, in set position, to support the operating lever, and fluid pressure actuated mechanism controlled by the pressure of the system for holding such resetting device in set position.

6. An automatic valve for sprinkler systems comprising a valve casing communicating with the system and with the water supply, a valve governing the water supply, an operating lever when in normal position arranged to hold the valve seated, a resetting device consisting of a pivoted bridge, an adjustable rod carried thereby and adapted, in set position, to support the operating lever, a bolt normally held projected into the valve casing to support the bridge in set position, and means governed by the air pressure of the system for retracting the bolt.

7. An automatic valve for sprinkler systems comprising a valve casing communicating with the system and with the water supply, a valve governing the water supply, an operating lever when in normal position arranged to hold the valve seated, a resetting device consisting of a pivoted bridge, an adjustable rod carried thereby and adapted, in set position, to support the operating lever, a bolt normally held projected into the valve casing to support the bridge in set position, and a movable abutment connected to said bolt and exposed to the air pressure of the system, which pressure is adapted to retract the bolt and permit the resetting device to fall to inoperative position.

8. An automatic valve for sprinkler systems comprising a valve casing having a pressure chamber communicating with the system and with the water supply, a valve governing the water supply, a lever arranged within said chamber and coöperating with the valve to close it, means controlled by the air pressure of the system to hold such lever in normal position, and a weight located within said pressure chamber and adapted to act on the lever in opposition to such air pressure.

9. An automatic valve for sprinkler systems comprising a valve casing communicating with the system and with the water supply, a valve governing the water supply, a lever arranged, when in normal position, to hold the valve seated, a flanged disk operatively connected with the lever and arranged to seat upon an interior wall of the casing, a weight connected with the disk, and means for normally maintaining the interior of the disk at atmospheric pressure.

10. An automatic valve for sprinkler systems comprising a valve casing communicating with the system and with the water supply, a lever arranged, when in normal position, to hold the valve seated, a flanged disk operatively connected with the lever and arranged to seat upon an interior wall of the casing, a weight connected with the disk, and a check valve for normally maintaining the interior of the disk at atmospheric pressure but adapted to close when the disk is unseated.

ALBERT BLAUVELT.

Witnesses:
S. E. HIBBEN,
LOUIS B. ERWIN.